M. A. FOOS.
DRY CELL.
APPLICATION FILED APR. 26, 1915.
1,196,225.
Patented Aug. 29, 1916.
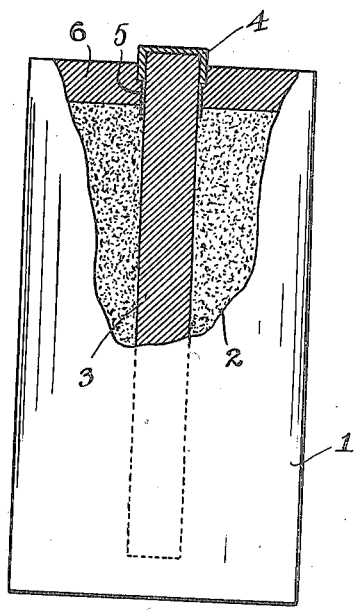
WITNESS
H. G. Grover
INVENTOR.
MARCUS A. FOOS
BY Ira J. Adams
ATTORNEY

UNITED STATES PATENT OFFICE.

MARCUS A. FOOS, OF FREMONT, OHIO, ASSIGNOR TO NATIONAL CARBON COMPANY, A CORPORATION OF NEW JERSEY.

DRY CELL.

1,196,225. Specification of Letters Patent. Patented Aug. 29, 1916.

Original application filed September 8, 1914, Serial No. 860,565. Divided and this application filed April 26, 1915. Serial No. 23,807.

*To all whom it may concern:*

Be it known that I, MARCUS A. Foos, a citizen of the United States, residing at Fremont, in the county of Sandusky and State of Ohio, have invented a certain new and useful Improvement in Dry Cells, of which the following is a full, clear, and exact description.

This invention relates to electric batteries, particularly to dry cells having a carbon electrode with a brass cap attached to the projecting end. Batteries of this type usually consist of a cylindrical zinc container having a bibulous lining, a central carbon electrode and an intermediate mix containing an electrolyte, a depolarizer and a conducting carbonaceous material, the zinc container being closed by a suitable pitch seal.

The carbon electrodes used are quite porous and the electrolyte of the mix consequently penetrates into the pores. On account of the capillary action the electrolyte gradually creeps up through the pores as well as up the outside of the electrode until it reaches the brass cap. This is easily corroded by the ammonium chlorid, zinc chlorid or other solution used as the electrolyte, which not only renders the connection bad mechanically, but also makes a high resistance terminal.

A corroded cap permits electrolyte to leak out readily, especially on heavy load, and the zincs of two adjacent cells in series are liable to be short circuited. The metal dissolved from the cap by the electrolyte also diffuses into the cell mix and deleteriously affects the action of the cell.

Battery carbons have been treated with paraffin to prevent the electrolyte from soaking through them to the metal cap, but this has not had any effect on the electrolyte creeping up between the seal and the carbon. Pitch, and other materials used at the present time as seals, do not adhere to the carbon, but tend to shrink away from it, which permits the electrolyte to pass up to the metal cap between the two.

My invention has for its object the prevention of the foregoing difficulties by the use of sealing materials, that seal perfectly with the carbon electrode and the battery seal, and the improvement deals particularly with a carbon electrode which is treated with a band of paint to prevent the electrolyte from creeping up the outside of the electrode.

The single figure of the drawings shows a partial sectional view of a dry battery containing an electrode treated in accordance with this invention.

Referring to the drawing: Reference numeral 1 designates the zinc container which is filled with the mix 2 consisting of depolarizer, electrolyte and carbonaceous material around a carbon electrode 3. The end of the electrode 3 is covered by a brass cap 4 and a band of paint 5 surrounds the neck of the electrode below the cap. The seal 6 is poured into the top of the cell preferably to such depth as to extend above the bottom of the cap as shown in the drawing. The cap is fixed to the electrode after the band of paint has been applied and when it is forced on the paint is scraped off the outside somewhat, and a good fit at the junction of the cap and the band results, the band of paint being preferably applied at such distance from the electrode end as to permit this. The entire end of the electrode may, however, be coated with the paint, but this will make a high resistance connection if the cap is slightly oversize and the band of paint is the preferred and more satisfactory form.

Pitch, sealing wax, and other forms of battery seals are selected on account of certain properties of hardness, viscosity, cheapness, etc. All seals that are satisfactory in these respects have the disadvantage that they will not adhere to the carbon electrode, but will shrink away from it enough to permit the electrolyte to creep up between it and the seal as previously explained. Asphalt and asphalt paints, however, seal perfectly with carbon and also with pitch. I therefore coat the upper end of the carbon with a band of asphalt or asphalt paint prior to pouring in the pitch seal and a hermetic joint is thus formed between the carbon and seal so that no electrolyte can reach the cap. The carbon electrodes are soaked in hot paraffin before applying the paint and no electrolyte can soak through the pores to the metal cap. The latter is, therefore, absolutely protected from corrosion from the electrolyte.

The paint could be applied after the cap is forced on the electrode, but the caps are preferably applied after the mix is tamped around the electrode in the cell in order to prevent corrosion during the tamping operation. However, this disadvantage may be overcome by applying the cap and then coating not only the upper end of the electrode but also the entire cap with paint. The electrolyte of the mix could therefore not attack the cap when it is tamped in the cell. This would necessitate removing the paint from the portion of the cap to which the binding post is attached in order to make a good electrical connection. Instead of coating the entire cap in this way with paint, the top may be left free from paint and coated with paraffin, the latter being more readily removed for attaching the terminals. In view of the disadvantages outlined, I however prefer to coat the electrode before applying the cap, but the invention is not to be limited thereto.

For painting the neck of the electrodes it is essential to use a paint which not only adheres to the electrode, but also dries quite rapidly. A further essential property of a suitable paint is that it must bond with the sealing material when it is poured around it. A number of materials have been tried for this purpose, but asphalt, particularly Egyptian asphalt, has proved to be the most suitable material. A cheaper material, which also possesses the required properties, is a solution of soft pitch in benzole. Black-baking japan and a roofing paint containing pitch and asphalt is suitable in respect to its bonding properties, but dries too slowly and thus smears from handling. Most quick drying pitch paints seem to be suitable, although other materials may be used.

In my application Serial No. 860,565 filed September 8, 1914, of which this application is a division, I have described and claimed apparatus for applying a band of paint, in accordance with this invention.

Having described my invention, what I claim is:—

1. In electric batteries, a container, a carbon electrode therein, a seal and a coating of material on said electrode adjacent the seal, said coating being adapted to form a hermetic joint with both the carbon electrode and the seal.

2. In a dry cell, a container, a central carbon electrode therein, a pitch seal and a band of paint on a portion of the electrode adjacent the seal, said paint joining hermetically with both carbon electrode and pitch seal.

3. In electric batteries, a container, an electrode therein, a metallic cap on the electrode, a battery seal between the electrode and the container and a band of material around the electrode at the base of the cap that seals with both the electrode and said battery seal.

In testimony whereof, I hereunto affix my signature.

MARCUS A. FOOS.